United States Patent [19]
Wright

[11] Patent Number: 4,738,589
[45] Date of Patent: Apr. 19, 1988

[54] PROPELLER MODULE FOR AN AERO GAS TURBINE ENGINE

[75] Inventor: William B. Wright, Derby, England

[73] Assignee: Rolls-Royce plc, London, England

[21] Appl. No.: 939,884

[22] Filed: Dec. 9, 1986

[30] Foreign Application Priority Data

Feb. 25, 1986 [GB] United Kingdom ............. 8604636

[51] Int. Cl.⁴ .................................................. B64C 11/44
[52] U.S. Cl. .......................................... 416/127; 416/129; 416/157 B
[58] Field of Search ............................ 416/127-130, 416/157 B

[56] References Cited

U.S. PATENT DOCUMENTS

| | | | |
|---|---|---|---|
| 2,394,299 | 2/1946 | Friedrich | 416/128 |
| 2,679,907 | 6/1954 | Frankland | 416/33 X |
| 2,876,848 | 3/1959 | Detamore et al. | 416/127 |
| 2,948,343 | 8/1960 | Conn et al. | 416/127 X |
| 3,545,881 | 12/1970 | Naulty | 416/157 R |
| 3,575,529 | 4/1971 | Bierman | 416/27 |
| 3,994,128 | 11/1976 | Griswold et al. | 416/162 X |
| 4,486,146 | 12/1984 | Campion | 416/129 |
| 4,563,129 | 1/1986 | Pagluica | 416/129 |
| 4,591,313 | 5/1986 | Miyatake et al. | 416/129 X |

FOREIGN PATENT DOCUMENTS

| | | | |
|---|---|---|---|
| 865943 | 6/1941 | France | 416/127 |
| 865942 | 6/1941 | France | 416/130 |
| 875564 | 9/1942 | France | 416/127 |
| 887543 | 11/1943 | France | 416/130 |
| 969611 | 12/1950 | France | 416/157 A |
| 977459 | 4/1951 | France | 416/130 |
| 402942 | 3/1943 | Italy | 416/127 |
| 403673 | 5/1943 | Italy | 416/127 |
| 407125 | 9/1944 | Italy | 416/130 |
| 2145777 | 4/1985 | United Kingdom | 416/127 |

Primary Examiner—Everette A. Powell, Jr.
Attorney, Agent, or Firm—Cushman, Darby & Cushman

[57] ABSTRACT

A propeller module for an aero gas turbine engine comprising two contra-rotating propellers has a reduction gear train positioned axially between the propellers. Pitch change mechanism are provided to change the pitch of the blades of both propellers independently of the differential speed of the propellers. The pitch change mechanisms comprise two sets of hydraulic motors one set of which is mounted on a carrier member of the gear train within the planet gears, the other set is mounted on the hub of the second propeller. Pitch selector valves control the supply of hydraulic fluid to the hydraulic motors, and the pitch selector valves are operated by a pitch change power unit. The pitch selector valves are positioned coaxially of the propellers and a transfer tube extends coaxially between the pitch selector valves to transfer hydraulic fluid therebetween independently of differential speed of the propellers.

16 Claims, 5 Drawing Sheets

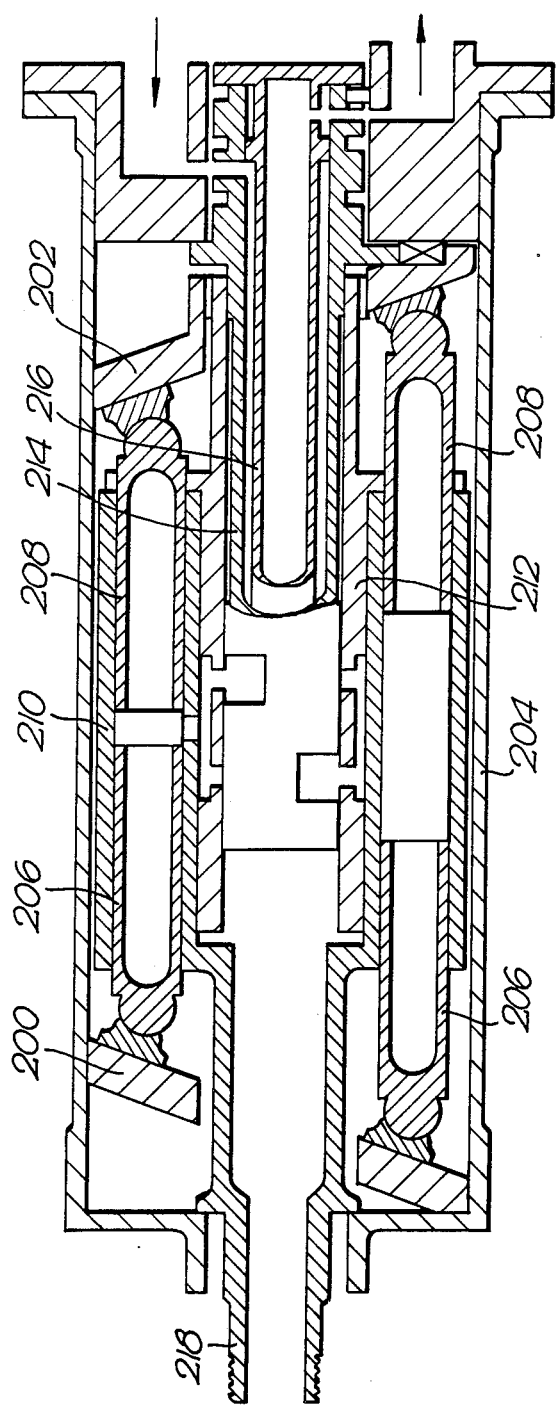

PROPELLER MODULE FOR AN AERO GAS TURBINE ENGINE

The present invention relates to a propeller module for an aero gas turbine engine, particularly for a propeller module comprising two contra-rotating propellers.

In one arrangement a propeller module for an aero gas turbine engine of the type with two contra-rotating propellers positioned at the upstream or downstream end of the gas turbine engine, known as tractor or pusher propellers respectively, requires a reduction gear to drive the propellers in contra-rotation. The propellers also require a mechanism to control blade pitch.

A reduction in axial length of the propeller module, and aero gas turbine engine, together with a reduction in weight of the aero gas turbine engine, has been achieved by positioning the reduction gear axially between the propellers, and rotatably mounting one propeller from a cantilever structure depending from the aero gas turbine engine, and rotatably mounting the second propeller on the first propeller.

This arrangement has made the control of blade pitch by an actuator remote from one of the propellers very difficult. However, our prior patent application No. 8509837 discloses a pitch change gear mechanism which is mounted on a planet carrier, and which varies the pitch of the propeller remote from an actuator by rotatably mounting pitch change gears on the planet gears of the reduction gear. The actuator rotates with the second propeller, and this causes the pitch change mechanism for the propeller remote from the actuator to be dependent on propeller differential speed.

Our prior patent application No. 8527056 corresponding to Ser. No. 914,163, filed Oct. 1, 1986 has a compensating gear arrangement which allows the pitch change mechanism for the propeller remote from the actuator to be independent of propeller differential speed.

These pitch change mechanism are complicated and are expensive to manufacture.

The present invention seeks to provide a propeller module of the type with two contra-rotating propellers driven by reduction gear positioned axially between the propellers which has pitch change mechanisms for both propellers which are independent of propeller differential speed and which are uncomplicated.

Accordingly the present invention provides a propeller module for a gas turbine engine comprising a first multi-bladed propeller and a second multi-bladed propeller, the first and second multi-bladed propellers being coaxial and driven in contra-rotation by coaxial shaft means via reduction gear means, the reduction gear means being postioned axially between the first and second multi-bladed propellers, the reduction gear means comprising a sun gear driven by the shaft, a plurality of planet gears driven by the sun gear and an annulus gear driven by the planet gears, the planet gears being rotatably mounted on and driving carrier means, the annulus gear amd carrier means being driven in contra-rotation by the planet gears, first and second pitch change means for the first and second multi-bladed propellers, the first and second pitch change means being operated by a pitch change power unit mounted on the hub of the second multi-bladed propeller, the first pitch change means comprising first drive means rotatably mounted on the hub of the first multi-bladed propeller and adapted to rotate the blades of the first multi-bladed propeller, first hydraulic motors mounted on the carrier means and arranged to drive the first drive means, the pitch change power unit is adapted to control the supply of hydraulic fluid to the first hydraulic motors and allows the pitch of the first multi-bladed propeller to be set independent of differential speed between the first and second multi-bladed propellers.

The second pitch change means may comprise second drive means rotatably mounted on the hub of the second multi-bladed propeller and adapted to rotate the blades of the second multi-bladed propeller, second hydraulic motors mounted on the hub of the second multi-bladed propeller and arranged to drive the second drive means, the pitch change power unit is adapted to control the supply of hydraulic fluid to the second hydraulic motors and allows pitch of the second multi-bladed propeller to be set independently of differential speed between the first and second multi-bladed propellers.

The pitch change power unit may control a first pitch selector valve, the first pitch selector valve is mounted on the carrier means, and is arranged to supply hydraulic fluid to the first hydraulic motors, operation of the pitch change power unit causes the first pitch selector valve to either supply hydraulic fluid to the first hydraulic motors to cause the first hydraulic motors to drive the first drive means to change the pitch of the first multi-bladed propeller or to stop the supply of hydraulic fluid to the first hydraulic motors.

The pitch change power unit may control a second pitch selector valve, the second pitch selector valve is mounted on the hub of the second multi-bladed propeller and is arranged to supply hydraulic fluid to the second hydraulic motors, operation of the pitch change power unit causes the second pitch selector valve to either supply hydraulic fluid to the second hydraulic motors to drive the second drive means to change the pitch of the second multi-bladed propeller or to stop the supply of hydraulic fluid to the second hydraulic motors.

The first and second pitch selector valves may be arranged coaxially with the first and second multi-bladed propellers, the second pitch selector valve being arranged downstream of the first pitch selector valve, a transfer tube extending coaxially with and axially between the first and second pitch selector valves to supply hydraulic fluid therebetween, the transfer tube supplying hydraulic fluid independently of the differential speed between the first and second multi-bladed propellers.

The first and second hydraulic motors may be swash plate motors.

The swash plate motors may comprise two swash plates arranged back to back in a casing, the swash plates being secured to the casing, a barrel member being positioned coaxially within the casing and axially between the swash plates, the barrel member having a plurality of pistons arranged to move axially to act on the swash plates, a shaft is secured to the barrel member, in operation the supplying of hydraulic fluid causes the pistons to move axially against the swash plates and so cause rotation of the barrel member and shaft.

The hydraulic fluid may be supplied from the reduction gear train, the hydraulic fluid being the gear train lubricant.

The gear train lubricant may be supplied via an HP pump driven by the reduction gear train.

The gear train lubricant may be supplied via an electrically driven pump, when the aero gas turbine engine is not in operation to feather the blades of the first and second multi-bladed propellers.

The first drive means may comprise a first drum positioned coaxially within and rotatably mounted on the hub of the first multi-bladed propeller, the first drum having a first recirculating ball screw and nut adapted to rotate the blades of the first multi-bladed propeller.

The second drive means may comprise a second drum rotatably mounted on the hub of the second multi-bladed propeller, the second drum having a second recirculating ball screw and nut adapted to rotate the blades of the second multi-bladed propeller.

The carrier member may drive the first multi-bladed propeller and the annulus gear may drive the second multi-bladed propeller.

The invention will be more fully described by way of reference to the accompanying drawings, in which:

FIG. 5 is an enlarged sectional view of a hydraulic motor forming part of the pitch change mechanism.

Figure 1:
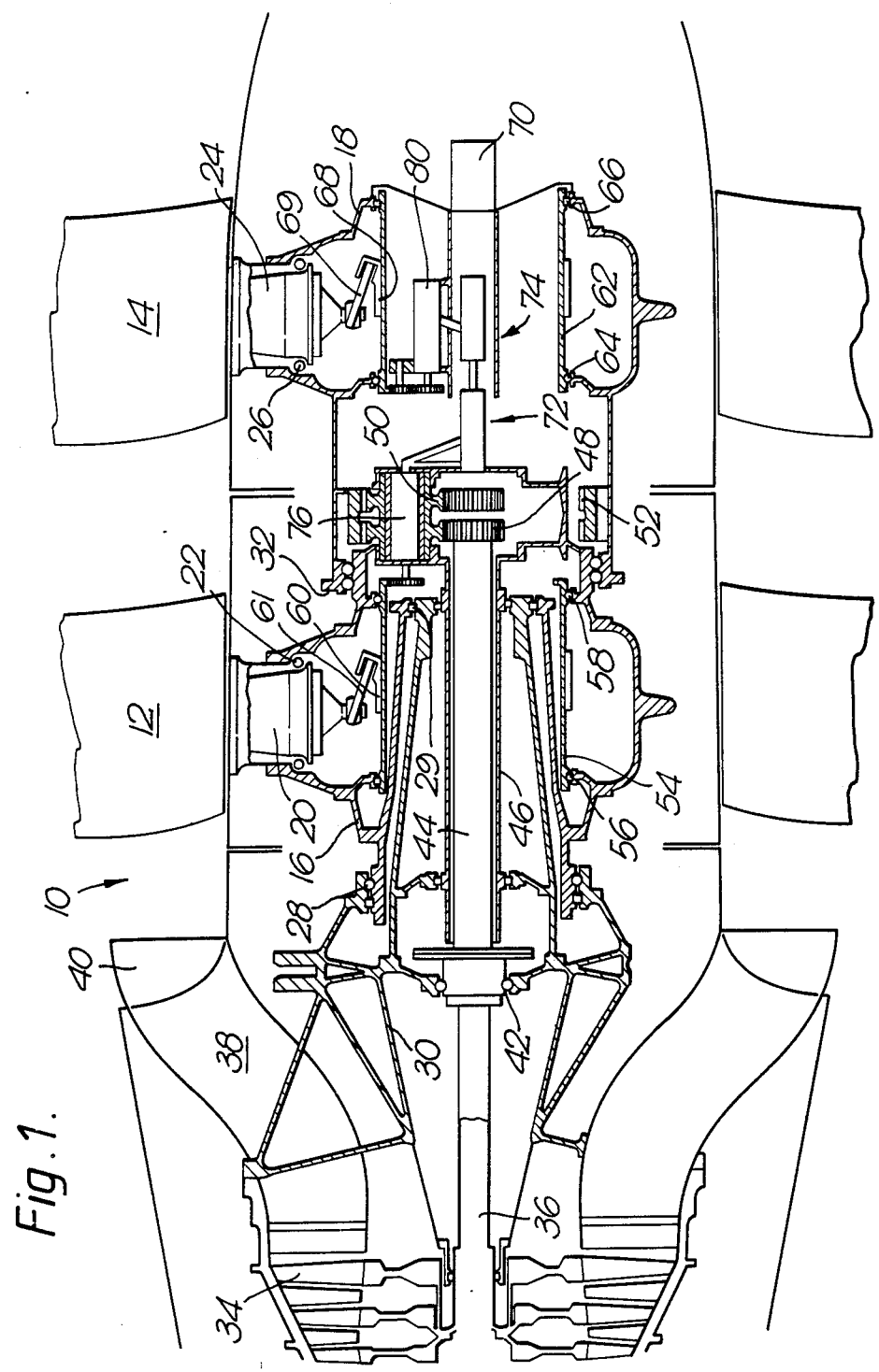
FIG. 1 is a sectional view longitudinally through a propeller module according to the present invention.

A propeller module 10 for an aero gas turbine engine is shown in FIG. 1, and in this example is a pusher type turbo-propeller aero gas turbine engine. The propeller module 10 comprises a first multi-bladed propeller 12 and a coaxial second multi-bladed propeller 14 arranged to be driven in contra-rotation. The first multi-bladed propeller 12 has a hub 16 which carries the blades, the blades being rotatably mounted in the hub 16 by means of pivotal root portions 20 of the blades and a corresponding ball bearing 22 for each blade root portion 20. Similarly the second multi-bladed propeller 14 has a hub 18 which carries the blades, the blades also being rotatably mounted in the hub 18 by means of pivotal root portions 24 and a corresponding ball bearing 26 for each blade root portion 24.

The first multi-bladed propeller is rotatably mounted to a cantilevered structure 30, which extends in a downstream direction from the aero gas turbine engine, by means of bearings 28 on the upstream end of the hub 16 and bearing 29 on the downstream end of the hub 16. The cantilevered structure extends coaxially into the propeller hub 16, and a shaft 36 from a power turbine 34 extends coaxially through the cantilevered structure 30 and is secured coaxially to an extension shaft 44. The second multi-bladed propeller 14 is rotatably mounted onto the hub 16 of the first multi-bladed propeller 12 by means of bearings 32.

The extension shaft 44 drives a reduction gear train positioned coaxially with and axially between the first and second multi-bladed propellers. The extension shaft has a sun gear 48 secured thereto, the sun gear 48 meshing with and driving a number of planet gears 50 rotatably mounted in a carrier 46. The planet gears 50 in turn meshing with and driving an annulus gear 52. The annulus gear 52 drives the hub 18 and second multi-bladed propeller 14, and the carrier 46 drives the hub 16 and the first multi-bladed propeller 12 in contra-rotation to the second multi-bladed propeller 14.

The first and second multi-bladed propellers 12,14 respectively have pitch change mechanisms, the first and second multi-bladed propellers 12 and 14 have a first and a second drum 54 and 62 respectively which are positioned coaxially within and rotatably mounted on the hubs 16 and 18 by bearings 56,58 and 64,66 respectively. The first and second drums 54 and 62 have recirculating ball threads, and nuts 60 and 68 are mounted on the threads of the drums.

The nuts 60 and 68 have a plurality of circumferentially arranged equi-spaced arms 61 and 69, one for each propeller blade, which are secured to the pivotal root portions 20 and 24 of the multi-bladed propellers. As the pivotal root portions 20 and 24 are rotatably mounted in the hubs 16 and 18 by ball bearings 22 and 26, movement of the nuts 60 and 68 along the drums 54 and 62, by rotation of the drums, will allow the propeller blades to be rotated to vary the pitch of the propeller blades.

The pitch of the propeller blades is varied by relative rotation between the hubs 16,18 and the drums 54,62 which causes the nuts 60 and 68 to rotate on the drums. The first and second drums are caused to rotate relative to the hubs by a pitch change power unit 70, and further pitch change mechanisms 72,74.

The exhaust gases from the power turbine 34 flow through a number of lobed ducts 38 which direct the exhaust gases through exhaust outlets 40 which are positioned upstream of the propellers 12 and 14.

Figure 4:
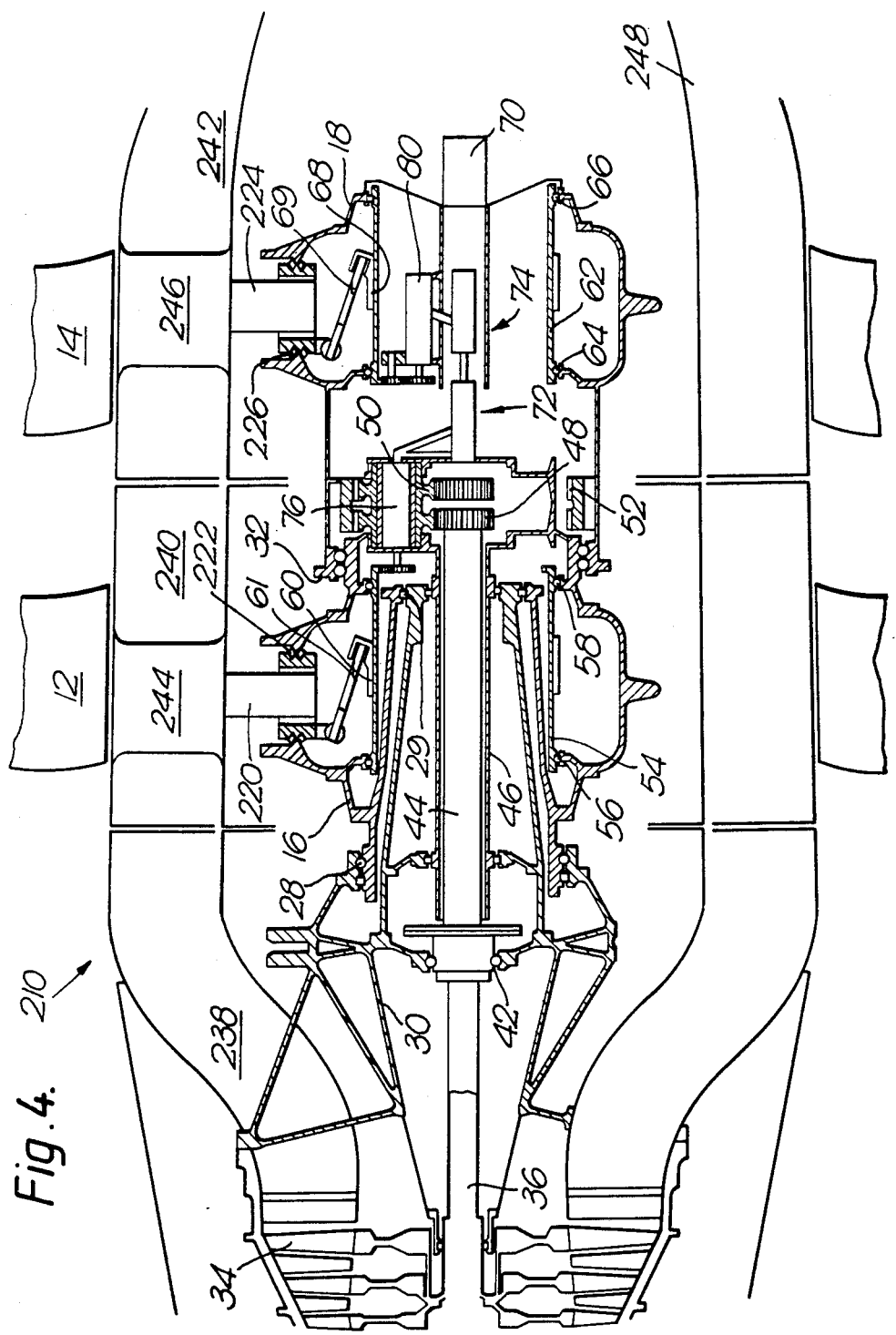
FIG. 4 is a sectional view longitudinally through a further propeller module according to the present invention.

The propeller module 210 in FIG. 4 is subtantially the same as that in FIG. 1. The major difference is that the propeller module 210 has an annular exhaust duct formed from a duct portion 238 at the downstream end of the aero gas turbine engine and duct portions 240 and 242 formed axially through the first and second propellers radially between the blades and the reduction gear train, pitch change mechanism.

The duct portions 240 and 242 have hollow vanes 244 and 246 respectively which extend radially across the annular duct and which have quill shafts 220 and 224 respectively positioned therein. The quill shafts 220 and 224 extend radially and are rotatably mounted on the hubs 16 and 18 respectively by taper roller bearings 222 and 226 respectively. Each quill shaft is secured to a respective blade and movement of the nuts 60 and 68 along the drums 54 and 62 by rotation of the drums causes the propeller blades to be rotated in order to vary the pitch of the propeller blades.

Figure 2:
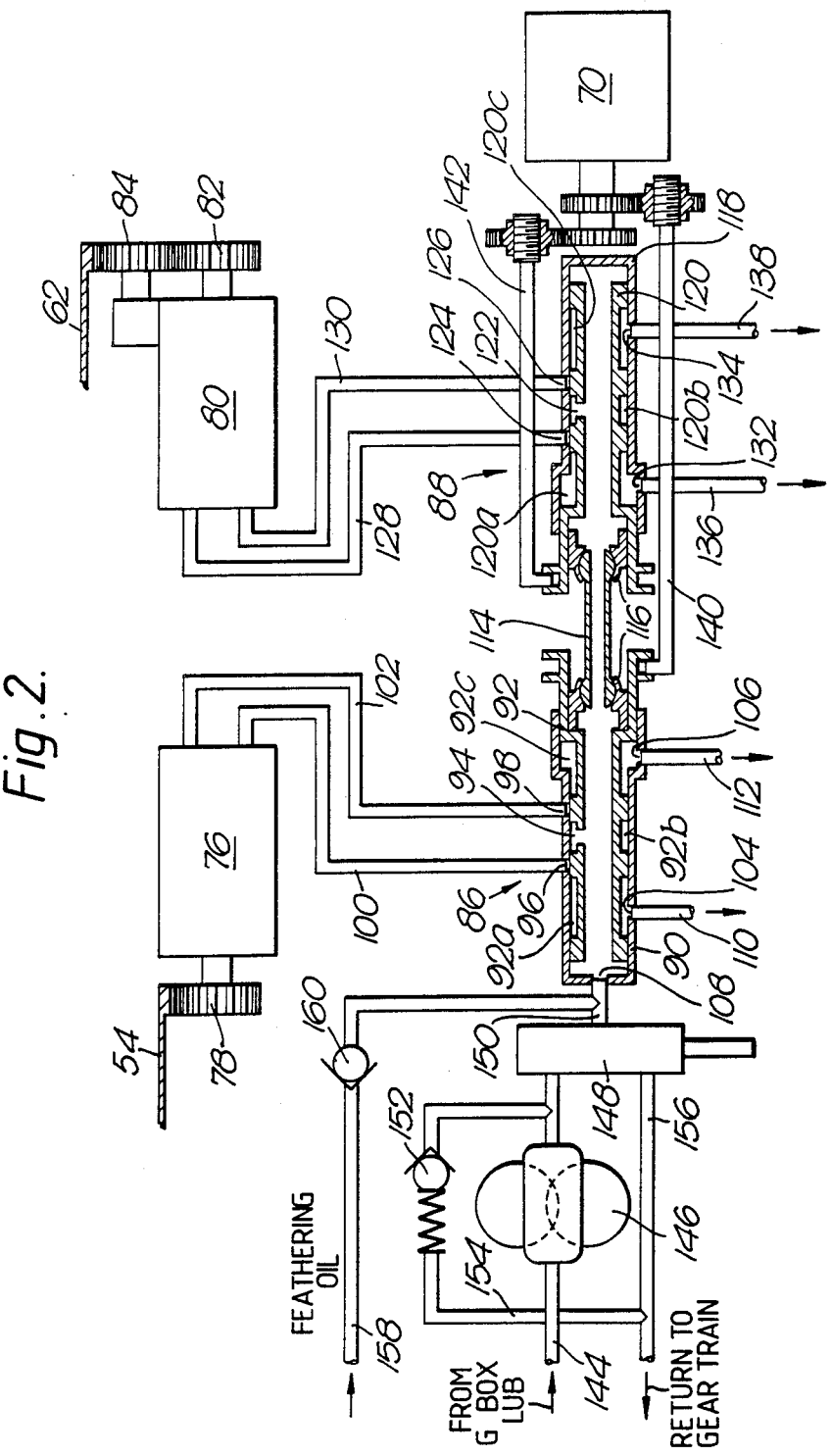
FIG. 2 is a diagrammatic representation of the pitch change mechanism.
Figure 3:
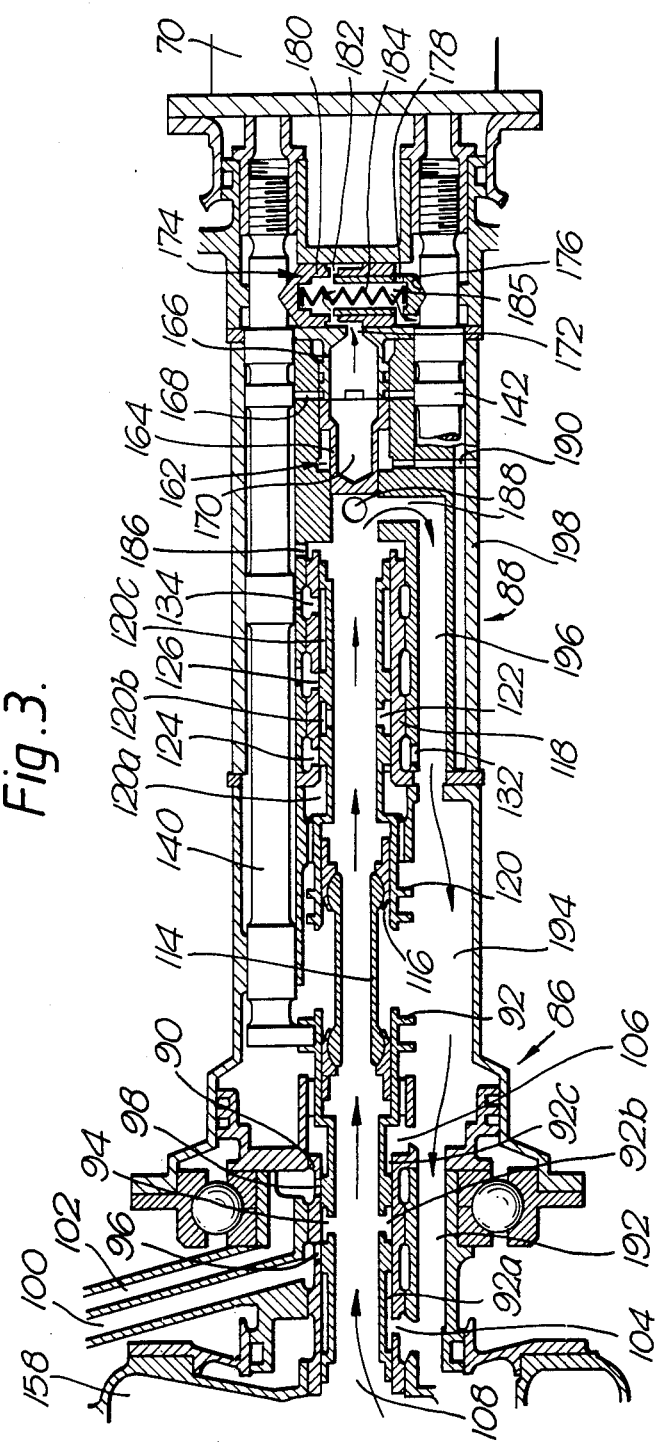
FIG. 3 shows and enlarged sectional view of a pair of pitch selector valves forming part of the pitch change mechanism.

FIGS. 2 and 3 show the pitch change mechanisms 72 and 74 diagrammatically. The first drum 54 is driven by a number of hydraulic motors 76 via simple spur gears 78. It is proposed to use two hydraulic motors but it may work equally well with more motors. The hydraulic motors 76 are securely mounted on the carrier 46 and are positioned within the planet gears 50. The second drum 62 is also driven by a number of hydraulic motors via simple spur gears 82. The hydraulic motors 80 are mounted on the pitch change power unit 70 which is mounted on the hub of the second propeller. A further spur gear 84 may be required to mesh with the spur gear 82 and the drum 62 to change the direction of drive and bridge the gas between drum 62 and gear 82. The spur gear 84 is rotatably mounted on the hydraulic motor 80.

The hydraulic motors 76 and 80 are driven by hydraulic fluid supplied from a supply of hydraulic fluid, this may be a separate hydraulic supply or as is preferred may be supplied with hydraulic fluid from the main gear train supply.

The hydraulic fluid, the gear train lubricant, is supplied to the first hydraulic motors and the second hydraulic motors via pipe 144 and an H.P. oil pump 146 driven by the gear train to a first pitch selector valve 86 and second pitch selector valve 88.

The pipe 144 from the gear train to the pitch selector valve 86 is provided with a return pipe 154 downstream of the H.P. pump 146, and the return pipe 154 has a relief valve 152 arranged to open if the pressure of the lubricant downstream of the H.P. pump becomes higher than is required. The first pitch selector valve 86 controls the flow of hydraulic fluid to the first hydraulic motors 76 and the second pitch selector valve 88 controls the flow of hydraulic fluid to the second hydraulic motors 80. The pitch selector valves are arranged coaxially with the first and second multi-bladed propellers.

The first pitch selector valve 86 comprises a cylinder 90 within which is positioned a hollow pitch selector member 92. The pitch selector member 92 is open at both axial ends and has three annular grooves 92a, 92b and 92c formed in its outer surface which cooperate with the inner surface of the cylinder 90 to form chambers. The pitch selector member also has an aperture 94 which connects the hollow interior of the pitch selector member 92 with the central annular groove 92b. The cylinder 90 has two ports 96 and 98 which are connected to the hydraulic motors 76 via pipes 100 and 102 respectively, and also has two ports 104 and 106 which communicate with the chambers formed by the annular grooves 92a and 92c respectively and with the return pipes 110 and 112 to the gear train. The cylinder 90 has an inlet aperture 108 at one axial end which is supplied with hydraulic fluid from the H.P. oil pump 146. The axial end of the cylinder 90 remote from the aperture 108 is open, but the pitch selector member 92 forms a seal therewith.

The second pitch selector valve 88 comprises a cylinder 118 within which is positioned a hollow pitch selector member 120. The pitch selector member 120 is open at both axial ends and has three annular grooves 120a, 120b and 120c formed in its outer surface which cooperate with the inner surface of the cylinder 118 to form chambers. The pitch selector member also has an aperture 122 which connects the hollow interior of the pitch selector member 120 with the central annular groove 120b. The cylinder 118 has two ports 124 and 126 which are connected to the hydraulic motors 80 via pipes 128 and 130 respectively, and also has two ports 132 and 134 which communicate with the chambers formed by the annular grooves 120a and 120c respectively and with the return pipes 136 and 138 to the gear train. The cylinder 118 has an axial end which is open, but the pitch selector member 120 forms a seal therewith.

The first and second selector valves are arranged so that the second selector valve 88 is downstream of the first selector valve 86 and the open ends of the cylinders 90 and 118 face each other. A transfer tube 114 which has part spherical ends extends coaxially between the open ends of the cylinders 90 and 118, and is positioned within and sealed with the open ends of the pitch selector members by seal members 116 which have surfaces to mate with the part spherical surfaces of the transfer tube 114, and allow relative rotation.

The first pitch selector valve 86 is mounted on the carrier 46 and the second pitch selector valve 88 is mounted on to the hub of the second propeller.

The transfer tube 114 allows lubricant to be supplied from the first pitch selector valve 86 to the second pitch selector valve 88 and is not affected by the contra-rotation of the two multi-bladed propellers.

The pitch of the first and second multi-bladed propellers is controlled by the first and second pitch selector valves 86 and 88 respectively which control the flow of hydraulic fluid to the hydraulic motors 76 and 80. The first and second pitch selector valves are controlled in turn by the pitch change power unit 70 which operates control rods 140 and 142.

When the pitch change power unit 70 operates the control rods 140 and 142 they move axially of the propeller module 10 and cause the pitch selector member 92 in first pitch selector valve 86 and pitch selector member 120 in second pitch selector valve 88 to move axially.

The first and second pitch selector members are moveable by the control rods between three positions.

In FIG. 2 the pitch selector members 92 and 120 are in a second postion and are not supplying hydraulic fluid to the hydraulic motors, so the pitch of the blades is fixed.

When the aero gas turbine engine is in operation and the pitch of the blades is to be changed the pitch change power unit 70 drives the control rods 140 and 142 to move axially either in an upstream or downstream direction so that the apertures 94 and 122 in the pitch selector members 92 and 120 respectively communicate with either of the ports 96 or 98 and 124 or 126 in the cylinders 90 and 118 respectively.

If the control rods 140 and 142 are moved axially in an upstream direction the pitch selector members are moved to a first position and the apertures 94 and 122 in the pitch selector members 92 and 120 communicate with the ports 96 and 124 respectively. The hydraulic fluid is supplied through pipes 100 and 128 to the hydraulic motors 76 and 80 respectively which in turn drive the spur gears 78 and 80 to vary the pitch of the blades of the first and second multi-bladed propellers in one direction. The hydraulic fluid is then returned to the first and second selector valves 86 and 88 via pipes 102 and 130. The hydraulic fluid flows through ports 98 and 126 of the cylinders 90 and 118 respectively and into the annular grooves 92c and 120c of the pitch selector members 92 and 120 respectively and through ports 106 and 134 of the cylinders 90 and 118 respectively into pipes 112 and 138 to be returned to the gear train.

If the control rods 140 and 142 are moved axially in a downstream direction the pitch selector members are moved to a third position and the apertures 94 and 122 in the pitch selector members 92 and 120 respectively communicate with the ports 98 and 126 respectively. The hydraulic fluid is supplied through pipes 102 and 130 to the hydraulic motors 76 and 80 respectively which in turn drive the spur gears 78 and 80 to vary the pitch of the blades of the first and second multi-bladed propellers in the opposite direction. The hydraulic fluid is then returned via pipes 100,128 ports 96,124, annular grooves 92a,120a, ports 104,132 and pipes 110,136 repsectively to the gear train.

When the aero gas turbine engine is not in operation no H.P. oil can be supplied from the H.P. pump 146. If the pitch of the blades is to be changed when the aero gas turbine engine is not in operation feathering oil is supplied from an electrically driven pump along pipe 158 and through non return valve 160 to port 108 in the pitch selector valve 86. The pitch change power unit 70 causes operation of the pitch selector members 92 and 120 in the required direction to feather the blades.

FIG. 3 shows the pitch selector valves in greater detail and also a shuttle valve 162 and a sequence valve 174. The shuttle valve 162 is positioned coaxially with and axially downstream of the second pitch selector valve 88, and comprises a hollow shuttle member 164 arranged to move axially and a hollow member 166 which remains fixed. An opening 168 supplied hydraulic fluid into chamber 170 formed between the shuttle member 164 and member 166, and the member 166 has an opening 172 through which hydraulic fluid is supplied to the sequence valve 174.

The sequence valve 174 comprises two hollow cylindrical members 176 and 180 which extend radially. The hollow member 180 being slidably mounted to move radially. The hollow member 176 being slidably fitted into the hollow member 180 and a chamber 185 being defined therebetween. The hollow members 176 and 180 have angled faces at their radially outer ends to engage corresponding angled faces on the rods 142 and 144. The hollow member 176 has apertures 178 at its radial extremity adjacent the angled faces, and hollow member 180 has an annular groove and apertures 182 interconnecting the chamber 185 with chamber 170. A spring 184 is positioned within the chamber 185 to bias the hollow members apart.

Hydraulic fluid is supplied to the shuttle valve 172 via an aperture 186 in the second pitch selector valve 88 and the aperture 168. The hydraulic fluid is returned to the reduction gear train via apertures 188 formed at the downstream end of the second pitch selector valve 88 and by pipes 192,194 and 196 formed concentrically around the pitch selector valves 86,88 by a casing 198 which also houses the rods 140 and 142. The ports 104,106 in the first pitch selector valve 86 discharge hydraulic fluid into the pipe 192, and ports 132,134 of the second pitch selector valve discharge hydraulic fluid into pipe 196.

As shown in FIG. 3 the pitch selector valves are not supplying hydraulic fluid to the hydraulic motors.

Hydraulic fluid is supplied to the shuttle valve and sequence valve and the shuttle member 164 is axially abutting the member 166 and allows the hydraulic fluid to return to the reduction gear train through apertures 188 and pipes 192,194,196. When the pitch of the propellers is to be changed one or both rods 140,142 move axially and because of the angled faces the cylindrical members 176 and 180 of the sequence valve 174 move radially relatively towards each other. In moving relatively towards each other the hollow member 176 closes the opening 182 in the hollow member 180 and prevents hydraulic fluid flowing into chamber 185. The hydraulic fluid entering the chamber 170 now moves the shuttle member 164 axially upstream and closes the apertures 188 to prevent the return of the hydraulic fluid to the reduction gear train therethrough. This brings the HP pump up to full working pressure.

Movement of the rods 140,142 axially back to the position in FIG. 3 enables the hollow members of the sequence valve to move radially outwards under action of the spring and so reduce the pressure in the shuttle valve. This causes the shuttle member to move axially downstream to abut the hollow member and in so doing allows the flow of hydraulic fluid through apertures 188 to the reduction gear train, and the pressure of the hydraulic fluid reduces in the pitch selector valves and HP pump.

The hydraulic motors shown in FIG. 5 are of the swash plate type, but each comprises two swash plates 200 and 202 arranged back to back in a common casing 204, and the swash plates are fixed to the casing so that they will not rotate. A barrel member 210 is positioned coaxially within the casing 204 axially between the swashplates, and is arranged to drive an outut shaft 218 which drives the spur gears of the pitch change mechanism. The barrel member 210 has a number of pistons 206 and 208 which are arranged to move axially to act on the swash plates 200 and 202 respectively. Two tubes 214 and 216 arranged coaxially within the casing 204 and one within the other supply hydraulic fluid to the pistons 206 and 208 from the selector valves, and return hydraulic fluid from the pistons to the selector valves. When hydraulic fluid is supplied to the pistons, the pistons move axially outwards away from each other and because the swash plate is fixed the barrel member and shaft are caused to rotate and so drive the spur gears.

The direction of rotation of the barrel member and shaft is dependent upon which tube supplies the hydraulic fluid to the pistons.

The use of a gear train lubricant to drive the hydraulic motors results in a reduced flow of lubricant enabling the use of reduced capacity oil pressure and scavenge pumps.

The back to back swashplate hydraulic motor eliminates undesireable axial loads and doubles the power output.

Other suitable hydraulic motors could be used as well as the back to back swashplate motor.

The hydraulic motors have locking mechanisms which are freed by hydraulic pressure, but which lock the motors in the event of hydraulic power loss to maintain the pitch of the propeller blades.

I claim:

1. A propeller module for a gas turbine engine comprising a first multi-bladed propeller, a second multi-bladed propeller, shaft means and reduction gear means, the first and second multi-bladed propellers being coaxial and driven in contra-rotation by the coaxial shaft means through the reduction gear means, the reduction gear means comprising a sun gear, a plurality of planet gears, an annulus gear and carrier means, the sun gear being driven by the shaft means, the planet gears being driven by the sun gear and the annulus gear being driven by the planet gears, the planet gears being rotatably mounted on and driving the carrier means, the annulus gear and carrier means being driven in contro-rotation by the planet gears, first and second pitch change means for the first and second multi-bladed propellers, a pitch change power unit mounted on the hub of the second multi-bladed propeller, the first and second pitch change means being operated by the pitch change power unit, the first pitch change means comprising first drive means, first hydraulic motor means and a first pitch selector valve, the first drive means being rotatably mounted on the hub of the first multi-bladed propeller, the first hydraulic motor means being mounted on the carrier means for driving the first drive means to vary the pitch of the first multi-bladed propeller, the first pitch selector valve being mounted on the carrier means coaxially with the first multi-bladed propeller, the first pitch selector valve being arranged to supply hydraulic fluid to the first hydraulic motor means, the second pitch change means comprising second drive means, second hydraulic motor means and a second pitch selector valve, the second drive means being rotatably mounted on the hub of the second multi-bladed propeller and arranged to rotate the blades of the second multi-bladed propeller, the second hydraulic motor means being mounted on the hub of the second multi-bladed propeller for driving the second drive means to vary the pitch of the second multi-bladed propeller, the second pitch selector valve being mounted on the hub of the second multi-bladed propeller coaxially with the second multi-bladed propeller, the second pitch selector valve being arranged to supply hydraulic fluid to the second hydraulic motor means, the pitch change power unit having means to control the supply of hydraulic fluid to the first and second hydraulic motor means from the first and second pitch selector valves, the pitch change power unit being operable to cause the first and second pitch selector valves to either supply hydraulic fluid to the first and second hydraulic motors to cause the first and second hydraulic motor means to drive the first and second drive means to change the pitch of first and second multi-bladed propellers or to stop the supply of hydraulic fluid to the first and second hydraulic motor means, a transfer tube extending axially between the first and second pitch selector valves to supply hydraulic fluid therebetween, the transfer tube supplying hydraulic fluid independently of the differential speed between the first and second multi-bladed propellers.

2. A propeller module as claimed in claim 1 in which the first hydraulic motor means are mounted in the planet gears.

3. A propeller module as claimed in claim 1 in which each pitch selector valve comprises a cylinder and a hollow pitch selector member, the cylinder having an inner surface, the cylinder having first ports connected to the hydraulic motor means and second ports connected to the reduction gear means, the pitch selector member having an outer surface a first end and a second end, the pitch selector member being positioned coaxially within the cylinder, the first and second ends of the pitch selector member being open, a first chamber, a second chamber and a third chamber being formed between the outer surface of the pitch selector member and the inner surface of the cylinder, the second chamber being positioned axially between the first and second chambers, the pitch selector member having an aperture to connect the hollow interior of the pitch selector member with the second chamber, the pitch selector member being movable axially between a first position, a second position and a third position, in the first position hydraulic fluid is supplied from the hollow interior of the pitch selector member through the second chamber and the first ports to the hydraulic motors to vary the pitch of the blades in a first direction, in the second position hydraulic fluid is not supplied to the hydraulic motor means, in the third position hydraulic fluid is supplied from the hollow interior of the pitch selector member through the second chamber and the first ports to the hydraulic motor means to vary the pitch of the blades in the opposite direction.

4. A propeller module as claimed in claim 3 in which the transfer tube has ends, the ends of the transfer tube being positioned within and sealing with the ends of the pitch selector members of the first and second pitch selector valves.

5. A propeller module as claimed in claim 4 in which the ends of the transfer tube are part spherical.

6. A propeller module as claimed in claim 1 in which the first and second hydraulic motors are swash plate motors.

7. A propeller module as claimed in claim 6 in which the swash plate motors comprise two swash plates arranged back to back in a casing, the swash plates being secured to the casing, a barrel member being positioned coaxially within the casing and axially between the swash plates, the barrel member having a plurality of pistons arranged to move axially to act on the swash plates, a shaft is secured to the barrel member, in operation the supplying of hydraulic fluid causes the pistons to move axially against the swash plates and so cause rotation of the barrel member and shaft.

8. A propeller module as claimed in claim 3 comprising a first selector rod and a second selector rod, the pitch change power unit drives the first selector rod which is moveable axially to operate the first pitch selector valve, and drives the second pitch selector rod which is moveable axially to operate the second pitch selector valve.

9. A propeller module as claimed in claim 8 in which means are provided for supplying the hydraulic fluid from the reduction gear train, the hydraulic fluid being the gear train lubricant.

10. A propeller module as claimed in claim 9 in which the gear train lubricant is supplied by means including an H. P. pump driven by the reduction gear train.

11. A propeller module as claimed in claim 9 in which the gear train lubricant is supplied by means including an electrically driven pump, when the aero gas turbine engine is not in operation to feather the blades of the first and second multi-bladed propellers.

12. A propeller module as claimed in claim 3 in which a shuttle valve controls the return flow of hydraulic fluid from the first and second pitch selector valves to the reduction gear train, the shuttle valve is adapted to terminate the return flow of hydraulic fluid to the reduction gear train to increase the pressure of the hydraulic fluid supplied to the hydraulic motor by the pitch selector valves.

13. A propeller module as claimed in claim 12 in which a sequence valve means is provided to control the shuttle valve, the sequence valve being operated by the axial movement of at least one of the pitch selector rods.

14. A propeller module as claimed in claim 1 in which the first drive means comprises a first drum positioned coaxially within and rotatably mounted on the hub of the first multi-bladed propeller, the first drum having a first recirculating ball screw and nut adapted to rotate the blades of the first multi-bladed propeller.

15. A propeller module as claimed in claim 1 in which the second drive means comprises a second drum rotatably mounted on the hub of the second multi-bladed propeller, the second drum having a second recirculating ball screw and nut adapted to rotate the blades of the second multi-bladed propeller.

16. A propeller module as claimed in claim 1 in which the carrier member drives the first multi-bladed propeller and the annulus gear drives the second multi-bladed propeller.

* * * * *